(12) United States Patent
Thomas

(10) Patent No.: US 6,466,431 B1
(45) Date of Patent: Oct. 15, 2002

(54) MODULAR ELECTRONIC CONTROL UNIT MOUNTING DEVICE FOR A MOBILE VEHICLE

(75) Inventor: James A. Thomas, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/874,787

(22) Filed: Jun. 5, 2001

(51) Int. Cl.[7] ................................................. H02B 1/04
(52) U.S. Cl. ..................... 361/625; 180/65.1; 307/10.1; 361/809; 439/34
(58) Field of Search ........................ 312/223.1; 296/70, 296/155, 208; 174/69, 72 A, 72 TR, DIG. 9; 361/600, 601, 625, 679, 724–727, 807, 809, 810; 439/32, 34, 162, 174, 252; 180/90, 65.1, 65.8, 333; 211/26.2, 94, 151, 162, 126, 15, 41.17; 307/10.1

(56) References Cited

U.S. PATENT DOCUMENTS 3,858,091 A * 12/1974 Wilkinson ................... 361/724
4,153,127 A * 5/1979 Klink et al. ................ 180/65.1
5,324,203 A * 6/1994 Sano et al. ..................... 439/34
5,877,936 A * 3/1999 Nishitani et al.
6,161,894 A * 12/2000 Chapman ..................... 296/155

* cited by examiner

Primary Examiner—Gerald Tolin
(74) Attorney, Agent, or Firm—Jeffrey P. Calfa; Neil T. Powell; Dennis Kelly Sullivan

(57) ABSTRACT

A modular electronic control unit mounting device, mounting system and vehicle consisting of three essential parts, excluding the electronic control units or modules themselves. These are a mounting rack, a carriage, and a set of rails. The first part is the mounting rack upon which all the electronic modules are mounted. The rack mates with the carriage through a set of slides. The carriage is additionally mated with a pair of rails that are installed on a horizontal surface of the vehicle. The electronic modules or control units are engaged to the rack separate from the vehicle. The rack is engaged by slideably mating with the carriage. The carriage may be moved along the rails to its permanent location that does not need to be relatively near an access point or hatch of the vehicle.

14 Claims, 8 Drawing Sheets

MODULAR ELECTRONIC CONTROL UNIT MOUNTING DEVICE FOR A MOBILE VEHICLE

BACKGROUND

This invention relates to a system for installing and allowing easy maintenance or removal of electronic modules on a mobile vehicle. The device or system is intended to consolidate or standardize the mounting locations of several different electronic control units for various systems on a modern motor vehicle such as a heavy-duty truck or tractor. This device will allow for bench assembly of the electronic control units, with a single point of installation on the vehicle, thus effectively removing labor from main assembly lines to feed lines and shortening vehicle assembly time. It will also allow for a common mounting point for electronic control units. Further, it will provide a standard point within the vehicle to design wire harnesses to and thus eliminate much unnecessary engineering time during design and redesign stages. Additionally, it will remove the modules commonly mounted in storage areas to normally less accessible areas in order to enhance storage space on a day-to-day basis.

PRIOR ART

Electronic modules are common if not essential on modern mobile motor vehicles. Multiple electronic modules installed on a vehicle, each with various functions, is the most common scenario. These modules are located on electronic cards and slipped into permanent locations, many times fastened by conventional fasteners. The state of the art has not reached the stage where these modules have infinite life or at least reach the life of the vehicle. As a result, maintenance workers have to be able to access the modules, electronic control units, or module cards relatively easily for testing, removal, and replacement. Vehicle designers have had to locate these modules in slots that are conveniently located near access points on the vehicle else hear the wrath of vehicle maintenance personnel. The various modules are located wherever space is available in the vehicle. These modules commonly take up a lot of "storage" space, which is in short supply on the vehicle and very valuable to drivers. The permanent mounting in the prior art in areas designed for driver convenience is a large disadvantage, hence the requirement for this "stowable" rack. Additionally, there is no common mounting point. Such access point or hatch locations are in short supply on modern vehicles. Other devices also are needed to be close to the access points or hatches. A vehicle mounting device or system is needed such that electronic controllers may be easily accessed without having to necessarily have a permanent location relatively close to an access hatch.

SUMMARY

The modular electronic control unit mounting device, mounting system and vehicle of this invention satisfies the objective of this invention as follows. The device consists of three essential parts, excluding the electronic control units or modules themselves. These are a mounting rack, a carriage, and a set of rails. The first part is the mounting rack upon which all the electronic modules are mounted. This is a common mounting point for modules, related or unrelated functionally for the vehicle. The rack mates with the carriage through a set of slides. The carriage is additionally mated with a pair of rails that are installed on a horizontal surface of the vehicle. The electronic modules or control units are engaged to the rack separate from the vehicle. The rack is engaged by slidably mating with the carriage. The carriage may be moved along the rails to its permanent location that does not need to be relatively near an access point or hatch of the vehicle. The carriage may be locked into this position. This is facilitated through a rack mounted harness that is connectable to a section of the main vehicle electrical harness. This section of the main harness is intended to articulate the length of the slides, and is secured with adequate strain relief. The primary advantages to this unit are include: (1) improved, consolidated, and common mounting points for vehicle electronic control modules; (2) easy assembly and maintenance upon the modules; (3) easy access to the unit for troubleshooting; (4) reclaimed storage space that was formerly taken over by electronic control modules in inconvenient locations, while non-accessible space was wasted elsewhere in the vehicle; and (5) an improved method of mounting various electronic control units to the vehicle.

DRAWINGS

Other objects and advantages of the invention will become more apparent upon perusal of the detailed description thereof and upon inspection of the drawings, in which.

DETAILS OF INVENTION

Figure 1:
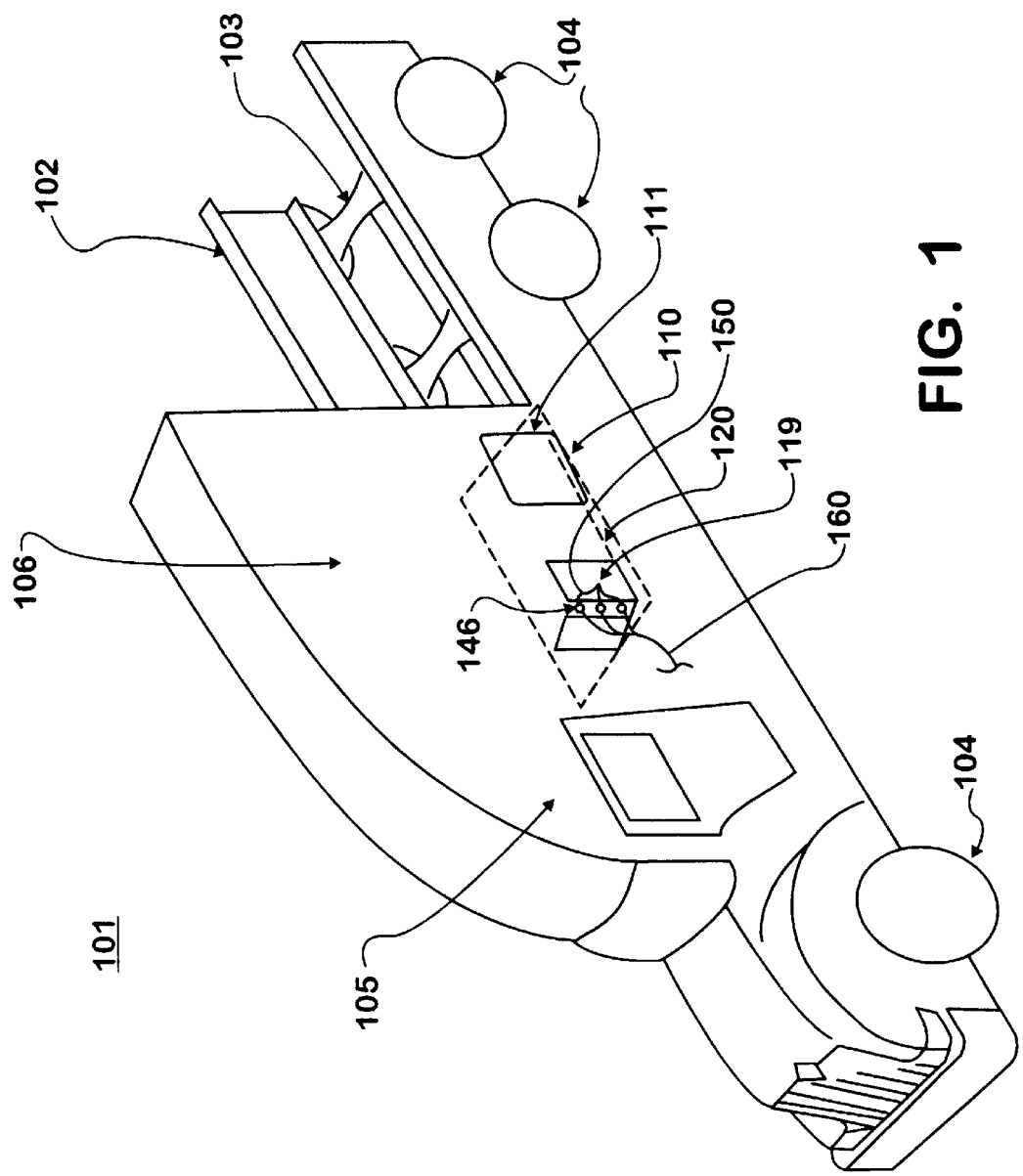
FIG. 1 is perspective of a vehicle containing an electronic control unit mounting device made in accordance with this invention, with the rack in its permanent installed location.
Figure 2:
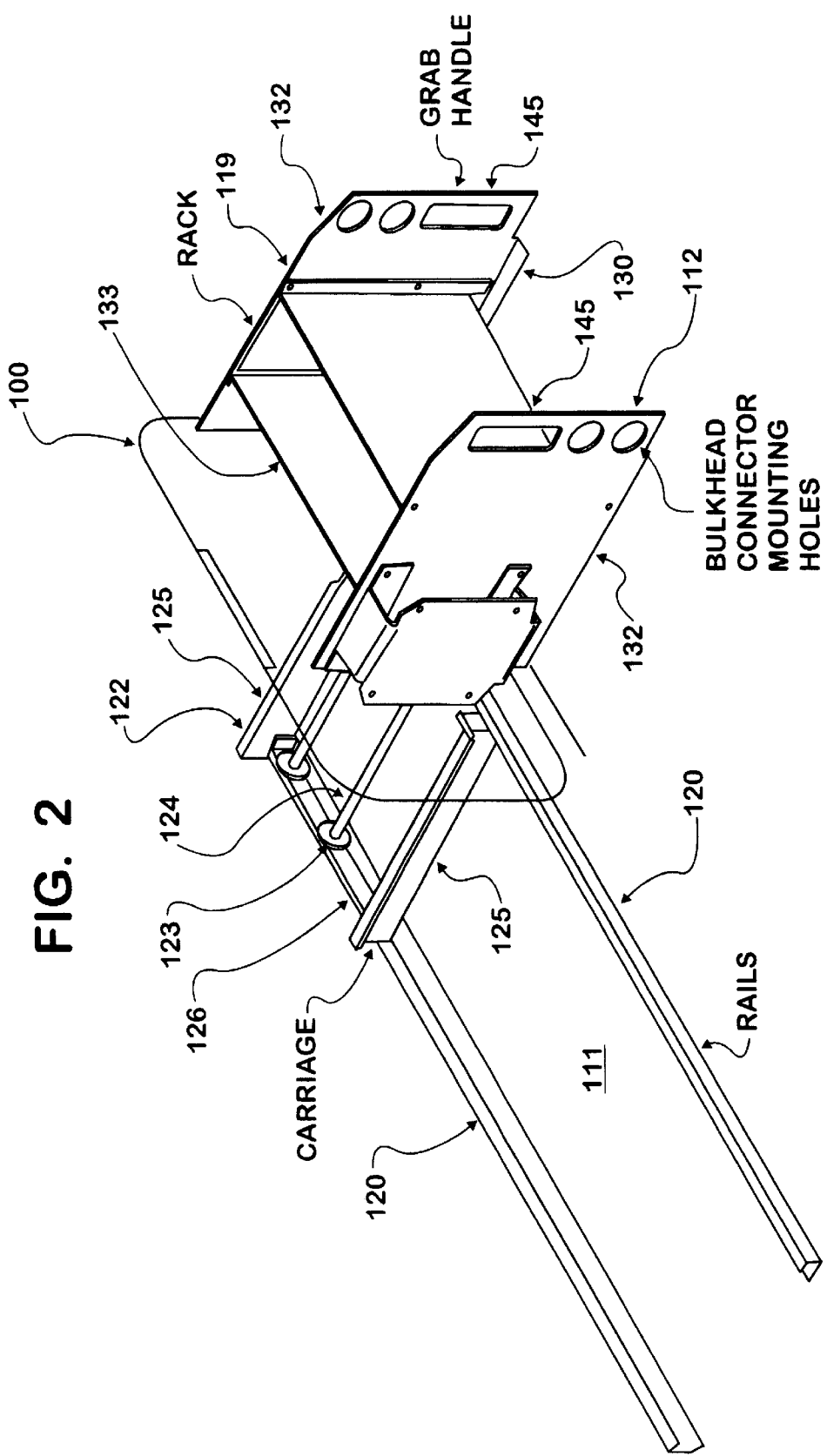
FIG. 2 is a perspective cut away view of a mounting device and system installed on the vehicle shown in FIG. 1, with the rack disengaged from the carriage shown with an outside the vehicle perspective.
Figure 3:
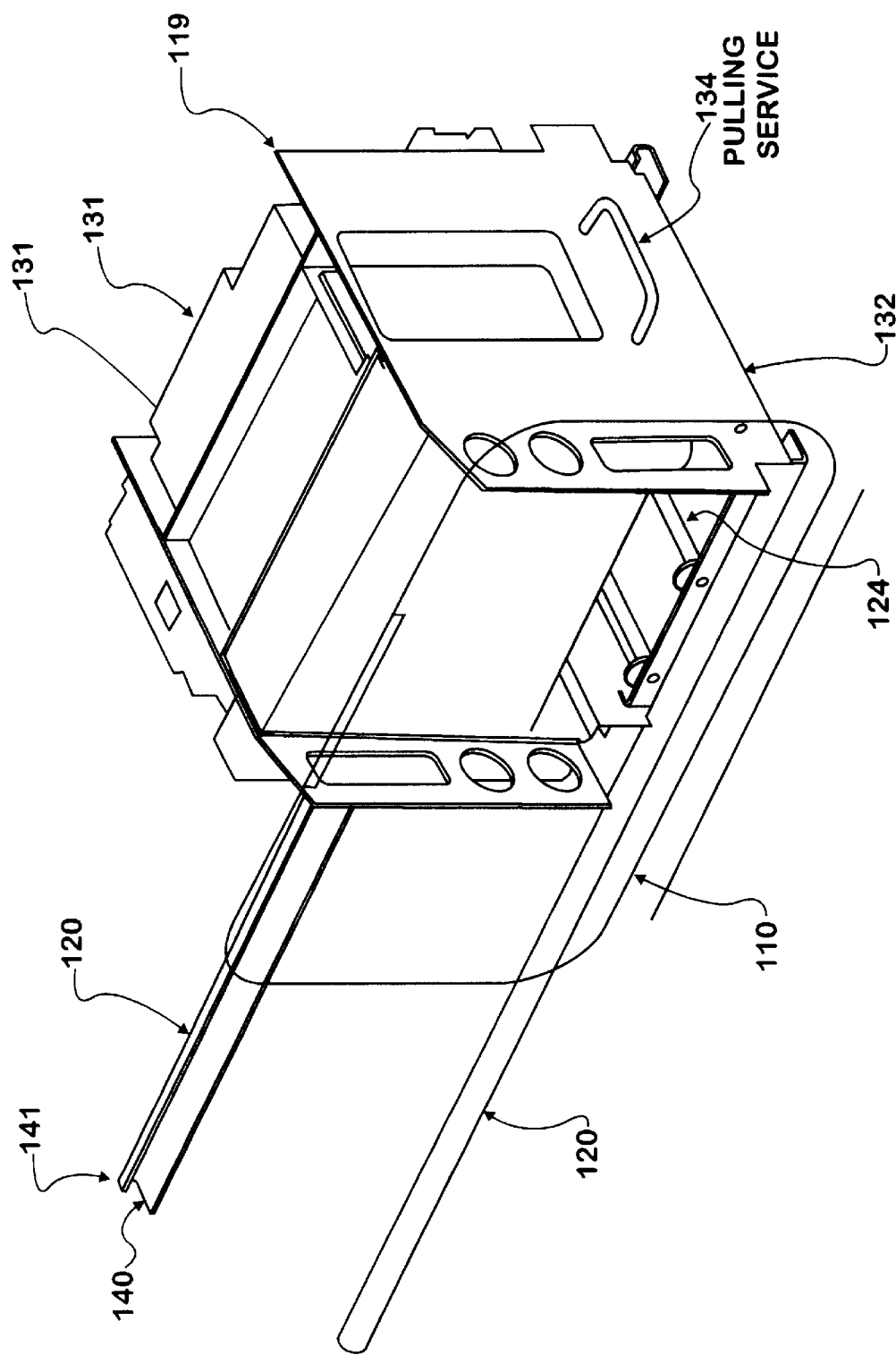
FIG. 3 is a perspective view of the mounting device and system of FIG. 2 with the rack installed to the carriage.
Figure 4:
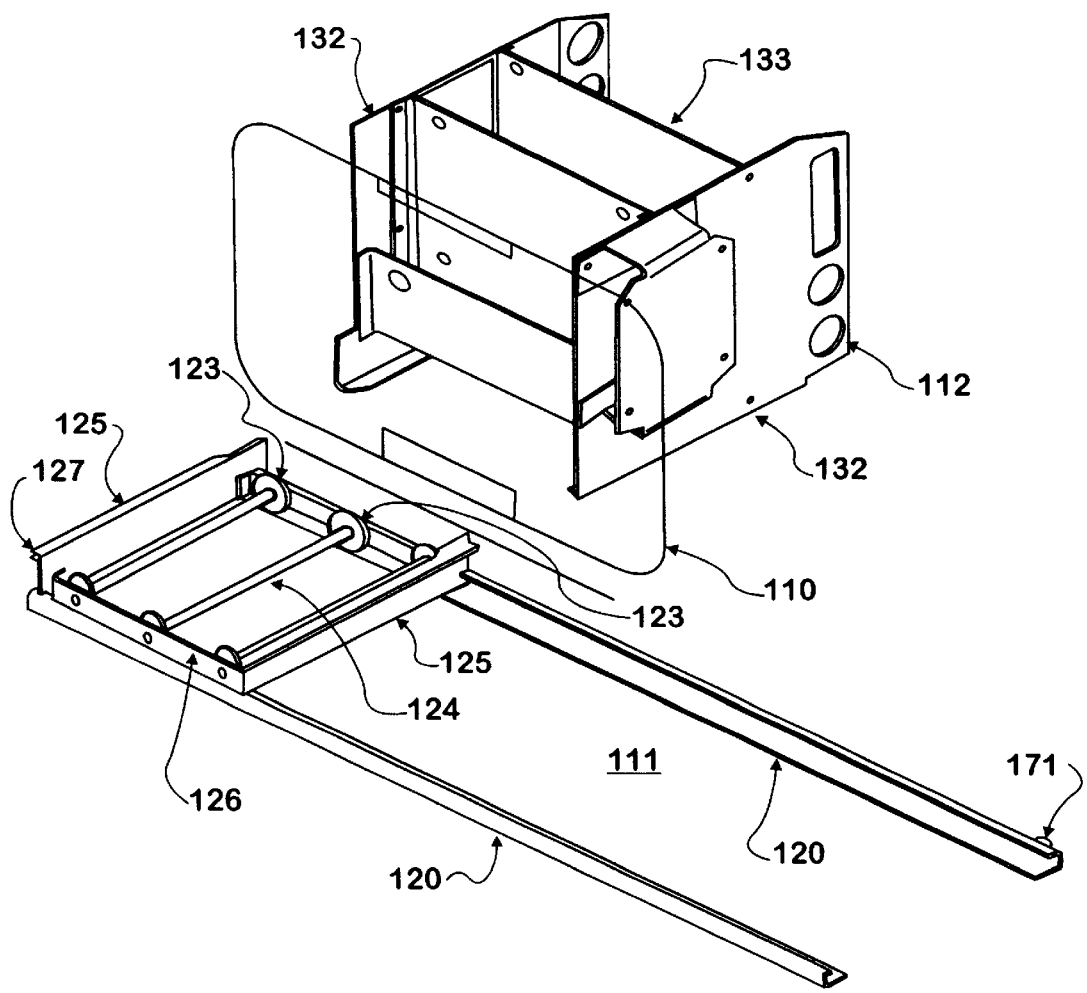
FIG. 4 is a perspective cut away view of a mounting device and system shown in FIG. 2, with the rack disengaged from the carriage shown with an inside the vehicle perspective.
Figure 5:
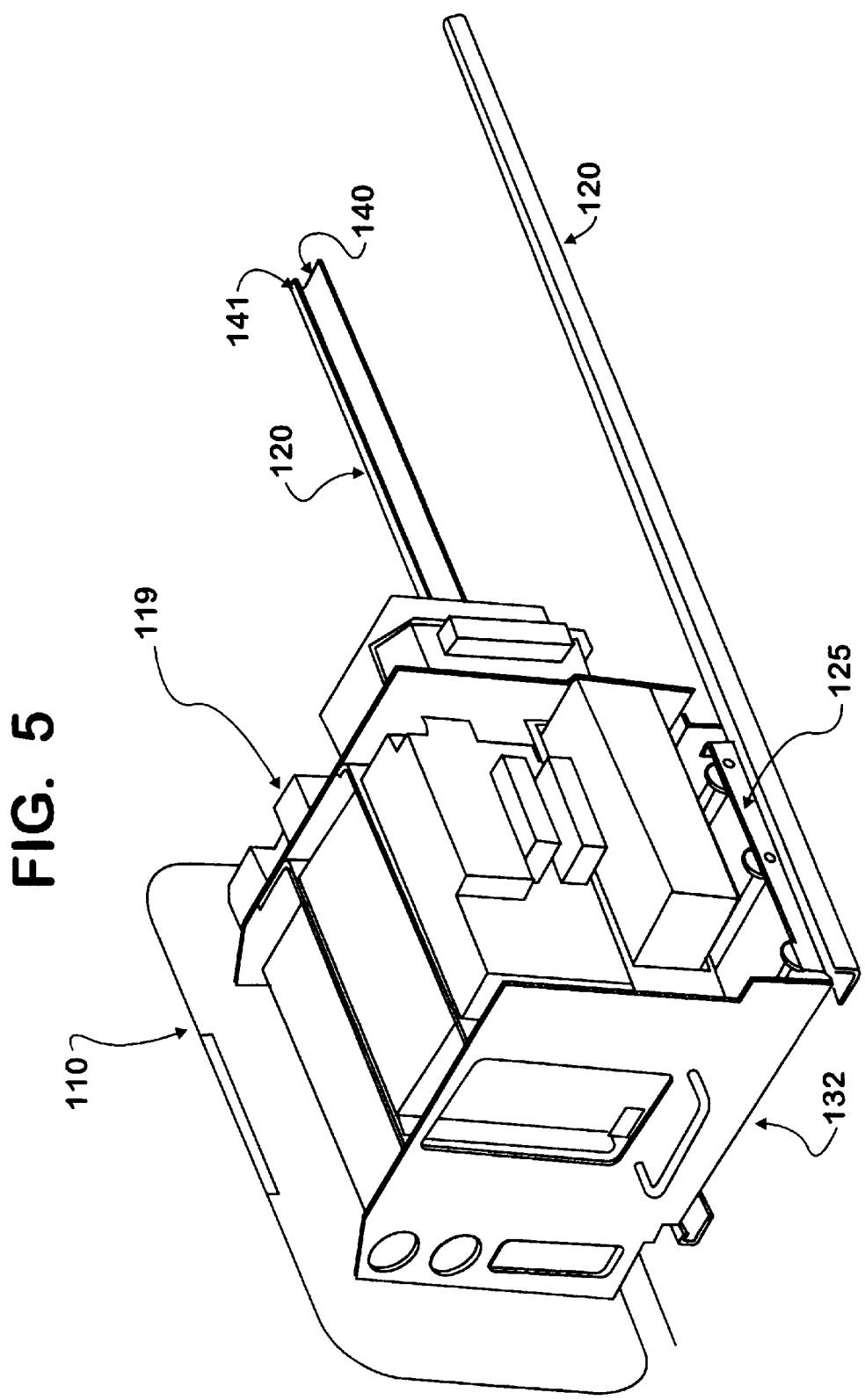
FIG. 5 is a rear view of FIG. 3.
Figure 6:
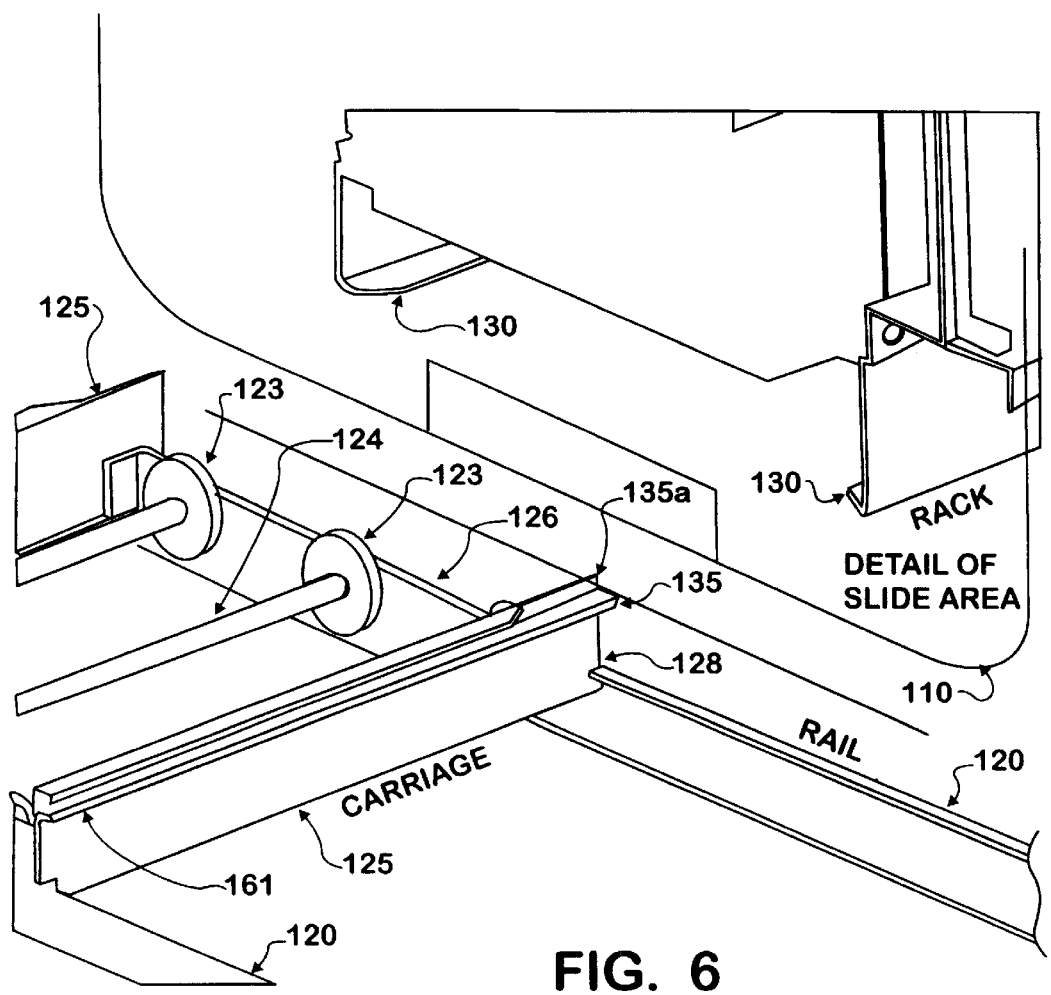
FIG. 6 is a close up view of the mating of the rack and carriage of FIG. 2.
Figure 7:
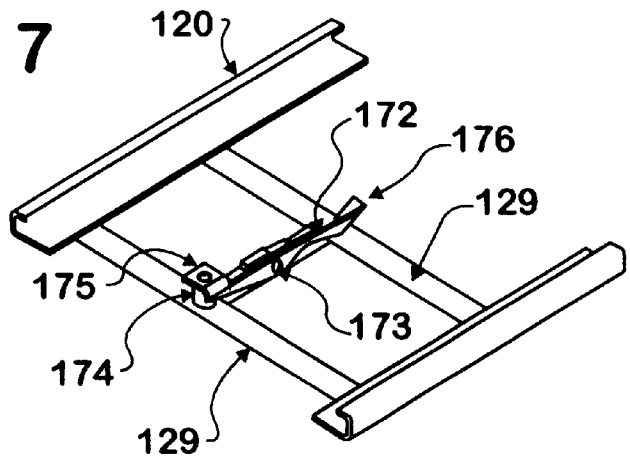
FIG. 7 is a perspective view of a carriage to cab locking mechanism of the device of FIG. 2.
Figure 7A:
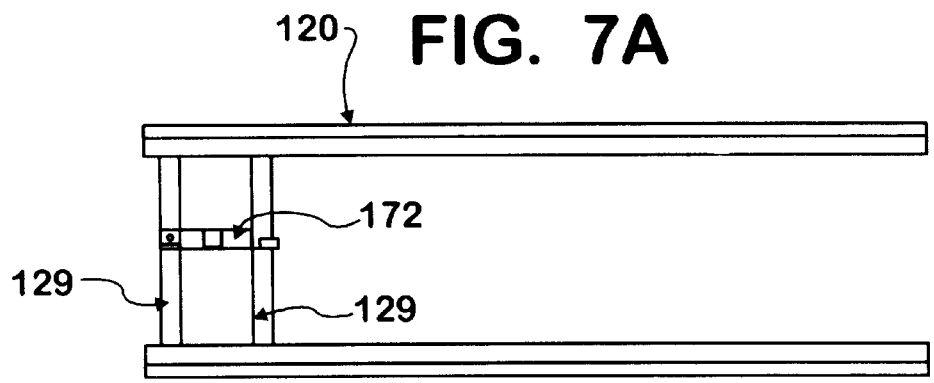
FIG. 7A is a top down view of FIG. 7.

FIG. 1 shows a vehicle 101 containing an electronic control unit mounting device made in accordance with this invention. The vehicle 101 has a chassis 102 engaged to axles 103 with wheels 104. There is a driver cab 105 engaged to the chassis 102. Heavy-duty highway vehicle cabs may contain a sleeper compartment 106. For demonstration purposes the electronic control unit mounting device and system shown in FIG. 1 is engaged in the externally accessible storage area in the sleeper compartment 106. The device may be installed in other vehicles 101 in different regions with different access points or hatches. The mounting system shown in FIGS. 1 to 6 is accessed through a luggage compartment access door 110. The access door 110 allows access to a horizontal mounting surface 111 of the vehicle 101. The mounting system consists of three essential parts: a module mount rack 119, a carriage 122 for engagement to the rack 119, and a pair of rails 120, the carriage 122 engaged to move along the rails. The pair of rails 120 is engaged to the horizontal-mounting surface 111 as shown in the figures. The mounting rack 119 is shown engaged to the rails 120 and in a permanent mounting location along the rails in FIG. 1.

The mounting rack 119 mates with the carriage 122 through a set of slides 130 shown on a lower surface of the rack 119. The carriage 122 also mates with the rails 120.

The mounting rack 119 generally has side walls 132 and electronic controller 131 mounting walls 133. At least one of the side walls 132 may contain a handle 134 for assisting in inserting and removing the rack 119 from the carriage 122 as well as potentially assisting in the directing of the rack 119 and carriage 122 along the rails 120. The mounting rack 119 may contain a rack wiring harness 150, which will connect to a main vehicle electrical harness 160 through bulkhead connector style electrical connectors 146 located in the large holes 112 near grab handles 145 in the sidewalls 132. At least one electronic controller or control module 131 may be engaged to the mounting rack 119. It is understood that multiple electronic control modules could be mounted to this unit. The electronic controller 131 is engaged electrically to the rack wiring harness 150. The rack wiring harness 150 will contain all the electronic controller wiring and connections, and run to the rack connectors which will interface with the main vehicle wiring harness via an articulated section with strain reliefs inside the sleeper cab. The mounting rack 119 acts as a common mounting point for electronic controllers 131, whether they are functionally related to each other or not.

The carriage 122 has two horizontal struts 126 engaged between a pair of cross members 125. The carriage 122 has a pair of runners or wheels 123, which may be engaged to axles 124. Each carriage-cross members 125 has a lower receiving lip 135 for engagement with the slides 130 of the rack 119. The carriage cross members 125 may also have an upper engagement lip 135a for a sandwich like engagement of the slides 130. In the version shown, the slides 130 are turned inwardly and the lower and upper receiving lips 135 and 135a of the carriage 122 are outwardly turned however this may be reversed. The cross members 125 may have mating grooves 128 on each end for engagement with an inwardly turned rail mounting lip 140 on each of the rails 120. The rail mounting lip 140 may in the alternative be outwardly turned.

In order to install this system, the rails 120 and carriage are affixed to horizontal mounting surface 111 prior to installation of vehicle interior trim parts. Subsequently, the mounting rack 119 is slid into engagement with the carriage 122. In the preferred embodiment the mounting rack 119 slides into engagement with the carriage 122 in a direction perpendicular to direction of carriage 122 movement along the rails 120. At least one rack to carriage locking mechanism engages the rack 119 to the carriage 122 when the slides 130 of the rack 119 are fully inserted.

Figure 8:
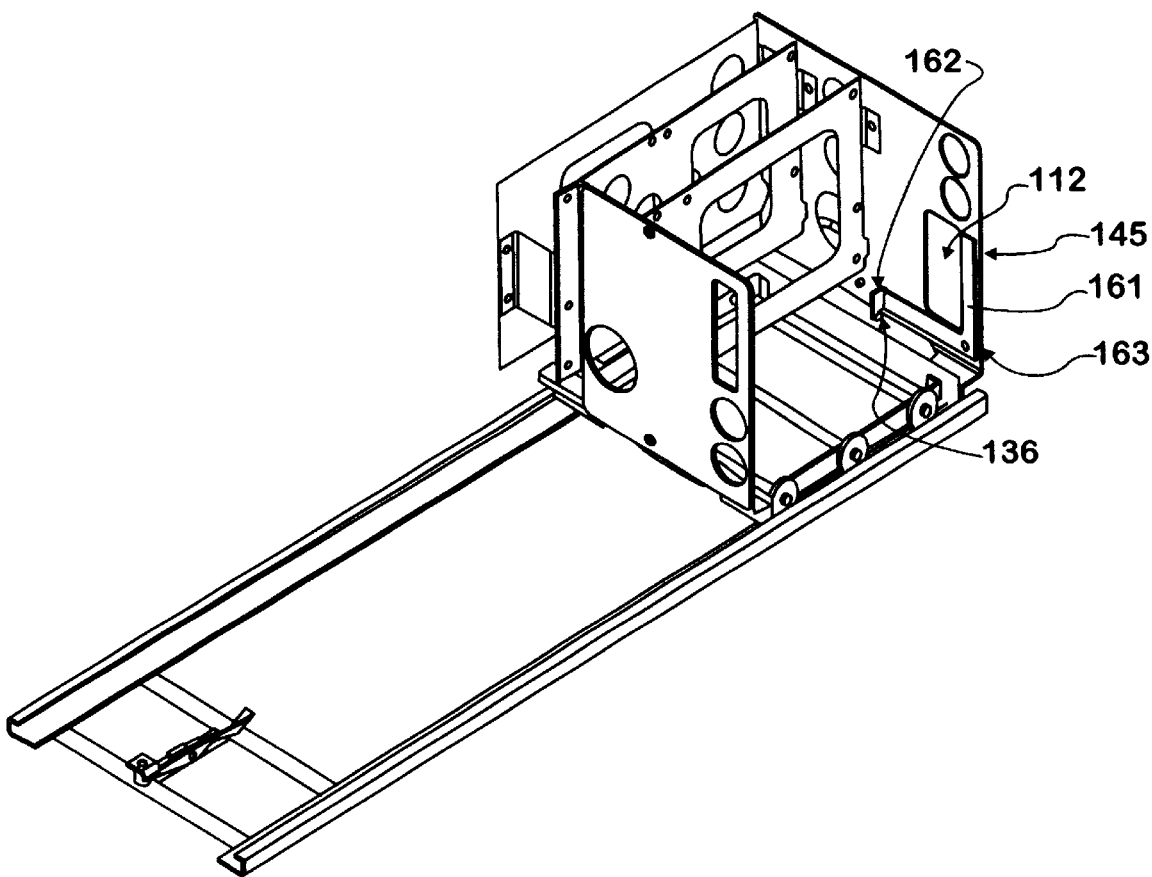
FIG. 8 is a perspective view of the carriage of FIG. 2, with the rack removed to show a rack to carriage locking mechanism and the carriage to cab locking mechanism.

One embodiment of this rack to carriage locking mechanism 161 is shown in FIG. 8. In this embodiment the upper surface of the upper receiving lip 135a of the carriage 122 has a rack engagement notch 136. The rack to carriage locking mechanism 161 has a carriage engagement prong 162 that can be pivoted to engage to the rack engagement notch 136 to lock the position of the rack 119 to the carriage 122. The rack to carriage locking mechanism 161 may pivot about a pivot pin 163 engaged to an inner side of the sidewall 132. An upper arm 162 may be in line with the large hole 112 near the grab handle 145. In that design, the user may cause the rack to carriage locking mechanism 161 to pivot releasing the rack 119 from the carriage 122 upon the grasping of the grab handle 145. The rack to carriage locking mechanism 161 may be in the alternative a different mechanism than shown such as a pressure locking mechanism.

The bulkhead connectors 146 are engaged providing electrical communication with the main vehicle harness 160 and associated components. The vehicle harness 160 may include an articulating section, secured to the cab with adequate strain relief to prevent wire distress during servicing procedures. The rack 119 and carriage 122 are pushed along the rails 120 to a position away from the access door 110. A pressure activated carriage to cab locking mechanism 171 engages the rack 119 and carriage 122 in its operation position when the rack 119 and carriage 122 are in position. The carriage to cab locking mechanism 171 is comprised of a locking pivot arm 172 that is engaged to the horizontal-mounting surface 111 or in the alternative to cross members 129 engaged between the rails 120 as shown. The locking pivot arm 172 pivots about a pin 173. A spring 174 forces the spring end 175 of the locking pivot arm 172 upward into engagement with the bottom of the carriage 122 as the carriage 122 is slid into position away from the access door 110. A disengagement handle 176 on the opposite end of the pivot arm 172 from the spring end 175 is lifted to act against the spring 174 to release the carriage 122 from the carriage to cab locking mechanism 171. The carriage 122 may be released by pulling the handle 176 to overcome the spring pressure.

In order to service or trouble shoot the vehicle 101, the mechanic opens the access door 110, grasps the rack by the handle 201, pulling the rack 119 and carriage 122 loose from the locking mechanism 171 and along the rails 120 so that the rack 119 is accessible through the access door. In this position, fuses may be accessed as well operating controls for the electronic controllers. Should it become necessary to service an individual electronic controller, the bulk head connectors 146 are uncoupled, and the whole rack 119 may be by unlocking the locking mechanism 161 between the carriage 122 and rack 119. The rack 119 may be slid outboard through the access door 110, away from the vehicle 101. Servicing can be performed easily on a workbench rather than awkwardly in the luggage compartment or other internal vehicle location.

As described above, the rack 119, carriage 122, and rails 120 and a vehicle 101 with these components installed provide a number of advantages, some of which have been described above and others of which are inherent in the invention. Also modifications may be proposed to the rack 119, carriage 122, and rails 120 and a vehicle 101 with these components installed without departing from the teachings herein.

I claim:

1. A mobile vehicle in combination with an electronic control unit mounting device, comprising:

a chassis engaged to axles with wheels;

a cab engaged to said chassis an access door to said cab to an area with a horizontal mounting surface;

a pair of rails engaged to said horizontal mounting surface;

a carriage engaged to move along said rails;

a module mount rack slidably engaged to and slidably disengageable from said carriage;

said rack engaged to at least one electronic controller; and said rack and said carriage having at least two positions along said rails, one accessible through said access door and one at an operation position relatively inaccessible through said access door.

2. The mobile vehicle combination of claim 1, wherein:

said rack slideable engagement with said carriage in a direction perpendicular to said carriage along said rails movement direction.

3. The mobile vehicle combination of claim 2, wherein:

said rack slideable engagement to said carriage held in installed position by a locking mechanism.

4. The mobile vehicle combination of claim 3, wherein said mounting rack comprising:

side walls engaged to electronic controller mounting walls;

a rack wiring harness connectable to a main vehicle electrical harness through bulkhead connector style electrical connectors located in said side walls; and said electronic controller engaged electrically to said rack-wiring harness.

5. The mobile vehicle combination of claim 4, wherein:

one of said side walls containing a handle for removing said rack from said carriage.

6. The mobile vehicle combination of claim 5, wherein:

a set of slides on a lower surface of said rack for engagement with said carriage.

7. The mobile vehicle combination of claim 6, wherein said carriage comprising:

two horizontal struts engaged between a pair of cross members;

a pair of runners engaged to said carriage for operating along said rail;

each of said cross members having a lower receiving lip for engagement with and support of said slides of said rack.

8. The mobile vehicle combination of claim 7, wherein:

said cross members having an upper engagement lip for a sandwich like engagement of said slides of said rack.

9. The mobile vehicle combination of claim 8, wherein:

said slides of said rack are turned inwardly; and said lower and upper receiving lips of said carriage are outwardly turned.

10. The mobile vehicle combination of claim 8, wherein:

said slides of said rack are turned outwardly; and said lower and upper receiving lips of said carriage are inwardly turned.

11. The mobile vehicle combination of claim 8, wherein:

said cross members have mating grooves on each end for engagement with an inwardly turned rail mounting lip on each of said rails.

12. The mobile vehicle combination of claim 8, wherein:

said cross members have mating grooves on each end for engagement with an outwardly turned rail mounting lip on each of said rails.

13. The mobile vehicle combination of claim 8, wherein:

said horizontal mounting surface of said cab is within a sleeper compartment of said cab.

14. The mobile vehicle combination of claim 13, wherein:

said access door being a luggage compartment door of said sleeper.

* * * * *